United States Patent [19]

Zelenz

[11] 3,800,240

[45] Mar. 26, 1974

[54] AUTOMATIC GAIN CONTROL CIRCUITRY AND FILTER

[75] Inventor: Martin L. Zelenz, Seneca Falls, N.Y.

[73] Assignee: GTE Sylvania Incorporated, Seneca Falls, N.Y.

[22] Filed: June 19, 1972

[21] Appl. No.: 263,921

[52] U.S. Cl. .................................. 330/52, 330/139

[51] Int. Cl. .................................. H03f 3/66

[58] Field of Search .......................... 330/52, 139

[56] References Cited

UNITED STATES PATENTS

| | | | |
|---|---|---|---|
| 2,660,712 | 11/1953 | Landon | 333/77 X |
| 1,869,715 | 8/1932 | Salisbury | 333/75 X |
| 1,874,242 | 8/1932 | Christopher | 333/75 X |
| 3,178,649 | 4/1965 | Thomas | 330/52 |
| 3,676,792 | 7/1972 | Newton | 330/52 X |
| 2,231,538 | 2/1941 | Kreer, Jr. | 330/52 X |
| 3,470,480 | 9/1969 | Smart et al. | 330/52 X |

*Primary Examiner*—Nathan Kaufman
*Attorney, Agent, or Firm*—Norman J. O'Malley; Robert E. Walrath; Thomas H. Buffton

[57] ABSTRACT

Circuitry for filtering and amplifying automatic gain control (AGC) pilot signals from a broadband signal is disclosed. Filters, each including a tapped winding with a series LC circuit connected to the tap, are tuned to the center frequencies of the pilot signals. The pilot signals are amplified, filtered again, and detected for use as AGC signals for a broadband amplifier.

5 Claims, 4 Drawing Figures

AUTOMATIC GAIN CONTROL CIRCUITRY AND FILTER

CROSS-REFERENCE TO RELATED APPLICATION

D. Lieberman and R. E. Neuber, "Amplifier Station," Ser. No. 130,088, filed Apr. 1, 1971, now U.S. Pat. No. 3,717,813, and assigned to the same assignee as the present invention.

BACKGROUND OF THE INVENTION

In broadband signal transmission systems, for example, of the type used to distribute community antenna television (CATV) signals via a coaxial cable, automatic gain control (AGC) is often used. The AGC is generally provided by the use of pilot signals which are independent of signal information. The gain controlled repeater amplifier in a typical CATV system may be required to amplify signals in the range of about 50 to 300 mHz or more. Since the coaxial cable attenuates high frequencies more than low frequencies, the gain control must compensate for differential attenuation as well as attenuation across the entire band. While a fixed differential compensation or equalization could be provided, the amount of differential attenuation varies especially with temperature. Thus, a quality broadband signal transmission system requires a variable equalization. Generally, flat gain control (also known as level control) and variable equalization or slope control are provided by the use of two frequency separated pilot signals. In a typical CATV system one pilot signal can be at 73 mHz or in the gap between television channels 4 and 5 while the other pilot signal can be at 163.5 mHz or slightly below channel 7.

As is illustrated in the above-referenced copending application, a typical CATV amplifier station can include a gain controlled trunk amplifier. A portion of the output signal from the repeater amplifier is coupled via a directional coupler to the AGC circuitry which separates the pilot signals from the other signals carried by the system. The pilot signals are also amplified and detected to provide the requisite control signals for flat gain and slope control of the repeater amplifier. A common prior art technique uses a directional coupler to sample the repeater amplifier output signals and couple the signals to a broadband booster amplifier to amplify both pilot signals sufficiently for reliable detection. After amplification the pilot signals are separated from the remaining signals by filters. A disadvantage of this technique is that a high output capacity booster amplifier is required to prevent overloading and consequent reflections of distortion products back to the repeater amplifier output. Another disadvantage is that double-tuned high-Q filters are required to provide sufficient attenuation of the adjacent signal frequencies to prevent such signals from interfering with the detectors.

Another prior art technique utilizes prefiltering of the tapped signal and a small signal RF amplifier for each pilot. This technique also requires double-tuned high-Q filters and further requires two booster amplifiers. Double-tuned filters are undesirable because they are difficult to align and are expensive.

Thus, the prior art techniques suffer from such disadvantages as expensive and complex circuitry, difficult filter alignment, and similar disadvantages.

OBJECTS AND SUMMARY OF THE INVENTION

Accordingly, it is a primary object of this invention to obviate the above noted and other disadvantages of the prior art.

It is also an object to provide a novel filter with high Q which is easily aligned and uses inexpensive components.

It is another object to provide novel filter structure wherein effective isolation for tuned circuits is provided so that filters can be connected in parallel.

It is a further object to provide novel circuitry for filtering and amplifying AGC pilot signals for use in AGC systems.

In one aspect of this invention the above and other objects and advantages are achieved with a narrow bandpass filter including a tapped winding connected between an input terminal and an output terminal and a capacitor and an inductor connected in series between the tap of the winding and a reference terminal.

In another aspect of this invention the above and other objects and advantages are achieved with improved automatic gain control circuitry in a broadband signal amplifier system having automatic gain control circuitry for automatically controlling a gain of an amplifier for amplifying a signal containing at least two frequency separated pilot signals. First and second filters having passbands including the frequencies of respective ones of the pilot signals are connected to the output of the amplifier. A second amplifier is connected to the outputs of the first and second filters for amplifying at least the pilot signals. Third and fourth filters having passbands including the frequencies of respective ones of the pilot signals are connected to the output of the second amplifier. A means for developing at least first and second control signals from the pilot signals is connected between the outputs of the third and fourth filters and the first amplifier for controlling the gain thereof.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
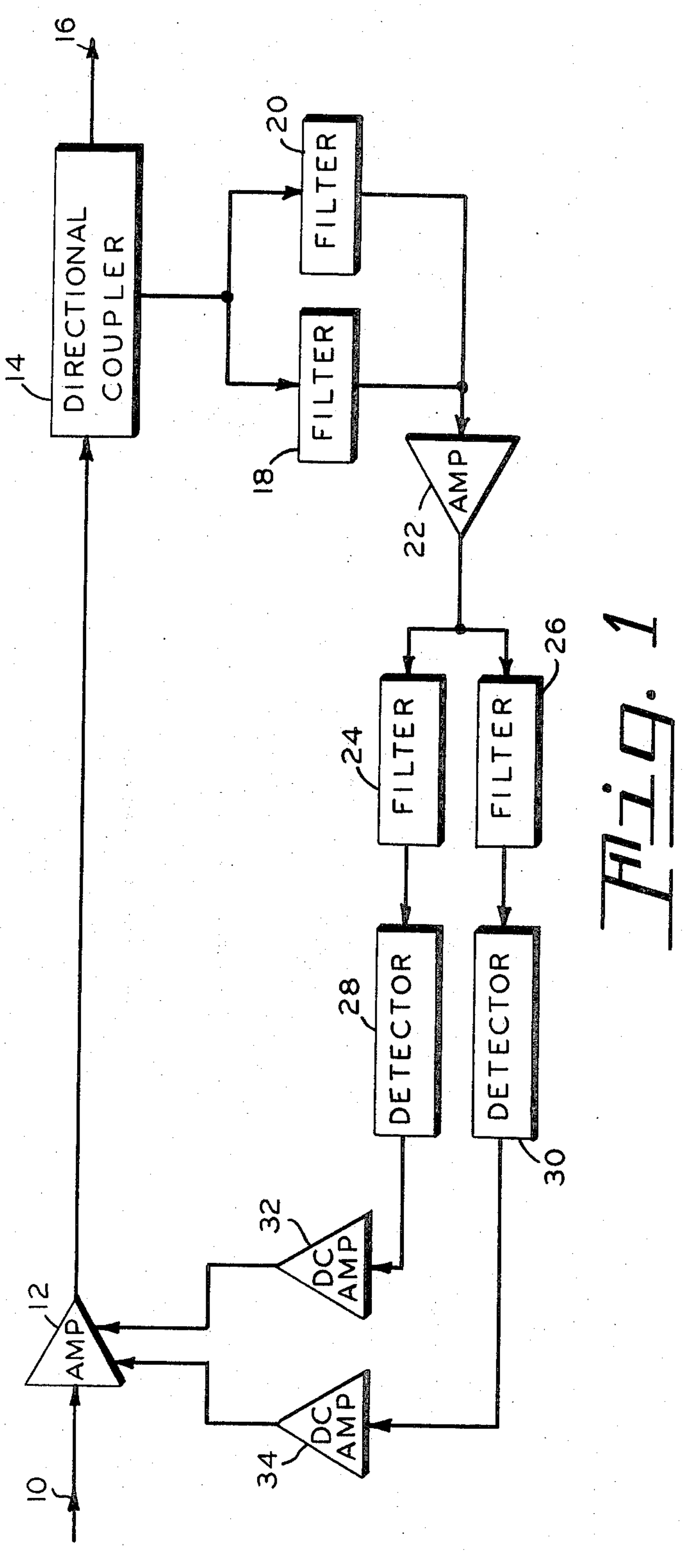
FIG. 1 is a block diagram of an automatic gain control system incorporating the invention.

In FIG. 1 a broadband signal amplifier system incorporating automatic gain control (AGC) circuitry in accordance with the invention is shown. A signal input means 10, which can be connected, for example, via typical circuitry to a coaxial cable, is connected to an input of a repeater or trunk amplifier 12. Amplifier 12 has an output connected via a directional coupler 14 to a signal output means 16 which can be connected, for example, via typical circuitry to a coaxial cable. The signals amplified by amplifier 12 include at least two frequency separated pilot signals which can be used to automatically control the gain of amplifier 12 by controlling the flat gain and slope of the amplifier.

Directional coupler 14 taps off a portion of the signal energy and couples it to the inputs of filters 18 and 20 which are preferably of the type illustrated in FIG. 2 and described hereinafter. Filters 18 and 20 are tuned to the frequencies of the pilot signals so that each filter has a passband including the frequency of a respective one of the pilot signals. The pilot signals are recombined at the outputs of filters 18 and 20 which are both connected to an input of an amplifier 22. Amplifier 22 can be a small signal amplifier since only two signal frequencies are present in primary strength. The output of amplifier 22 is connected to inputs of filters 24 and 26 which separate the pilot signals again and provide additional attenuation of undesired signal frequencies. Filters 24 and 26 each have a passband tuned to include the frequency of a respective one of the pilot signals. The outputs of filters 24 and 26 are coupled to respective ones of detectors 28 and 30 which detect the amplitude of the pilot signals and provide dc control signals corresponding thereto. The dc control signals are amplified by dc amplifiers 32 and 34, respectively, which are coupled to gain control inputs of amplifier 12. Amplifier 12 responds to the gain control signals to adjust the flat gain and slope or equalization of its response to maintain a substantially constant output signal level across the band of frequencies being amplified.

Figure 2A:
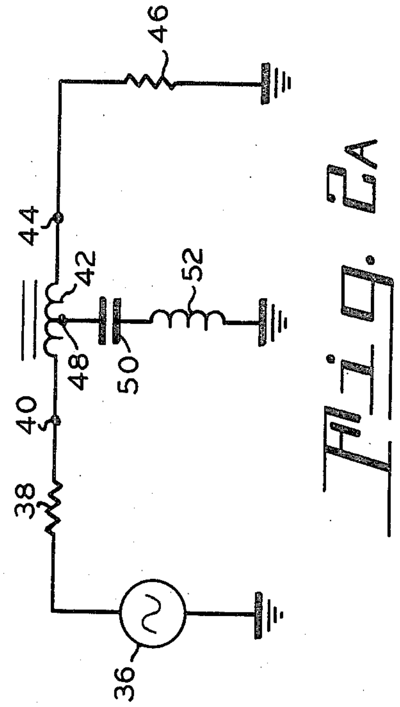
FIG. 2A is a schematic diagram of the preferred form of filter in accordance with the invention.

FIG. 2A illustrates a preferred form of filter in accordance with the invention. A signal source 36 is coupled via a resistor 38 to an input terminal 40 of the filter. Source 36 and resistor 38 represent, for example, the output of directional coupler 14 of FIG. 1 or of amplifier 22 in the application illustrated therein. Terminal 40 is coupled via a winding 42 to an output terminal 44. Terminal 44 is coupled via a resistor 46 to a common conductor or reference terminal illustrated as ground. Resistor 46 represents a load impedance. Winding 42 has a tap 48, which is preferably a center-tap, connected via a capacitor 50 in series with an inductor 52 to the reference terminal.

Figure 2B:
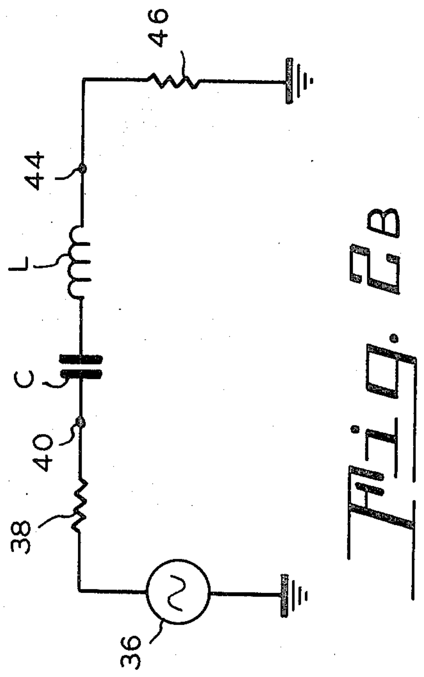
FIG. 2B is a schematic diagram of a series LC filter to aid in explaining FIG. 2A.

To understand the advantages of the filter of FIG. 2A, first consider a single-pole series LC filter connected between terminals 40 and 44 as is shown in FIG. 2B. The Q of a single-pole series LC filter is $Q = WL/(R_{38}+R_{46})$ where W is the resonant frequency, L is the inductance, and $R_{38}$ and $R_{46}$ are the resistances in series with the filter. The Q of this type of filter is not sufficiently large to provide the required selectivity since in typical CATV systems each pilot signal has a 6 mHz or less band between it and adjacent signal carriers and, typically, 25 db rejection is required to prevent adjacent signals from reaching the detectors. Also, LC filters cannot be readily connected in parallel because additional undesired resonant frequencies occur. Thus, more complex filter structure such as the prior art double-tuned circuits has been required.

Next consider the circuit of FIG. 2A. Preferably tapped winding 42 is of the type used in balun transformers. While an air core transformer can be used, such structure is physically large and difficult to adjust. Accordingly, winding 42 is preferably ferrite loaded, i.e., has a ferrite core. If center-tap 48 were unconnected, winding 42 would act as a simple inductor or choke which would highly attenuate all frequencies. If instead center-tap 48 were connected to ground, winding 42 would act as a broadband autotransformer which would invert and pass all signals. With the LC resonant circuit including capacitor 50 and inductor 52 connected between centertap 48 and the reference terminal, winding 42 acts as an autotransformer at frequencies near resonance and passes those frequencies but acts as a choke or isolator at off-resonant frequencies and suppresses those frequencies.

The resonant frequency of the filter of FIG. 2A is determined by capacitor 50 and inductor 52. The effective Q of the filter is $4WL/(R_{38}+R_{46})$ where L is the inductance of inductor 52 and W is the resonant frequency of capacitor 50 and inductor 52. As can be seen, the Q is multiplied by 4 thereby increasing the selectivity over a single-pole series LC filter as illustrated in FIG. 2B. This filter also has the added advantages of increased isolation because the balun transformer winding 42 acts as an isolator for the LC network at off-resonance frequencies. With increased isolation, the filter center frequency and stability are less affected by changes in load and source impedances. Also, paralleling of the filters as is illustrated in FIG. 1 is possible enabling the use of a common booster amplifier 22 to amplify both pilot signals.

Figure 3:
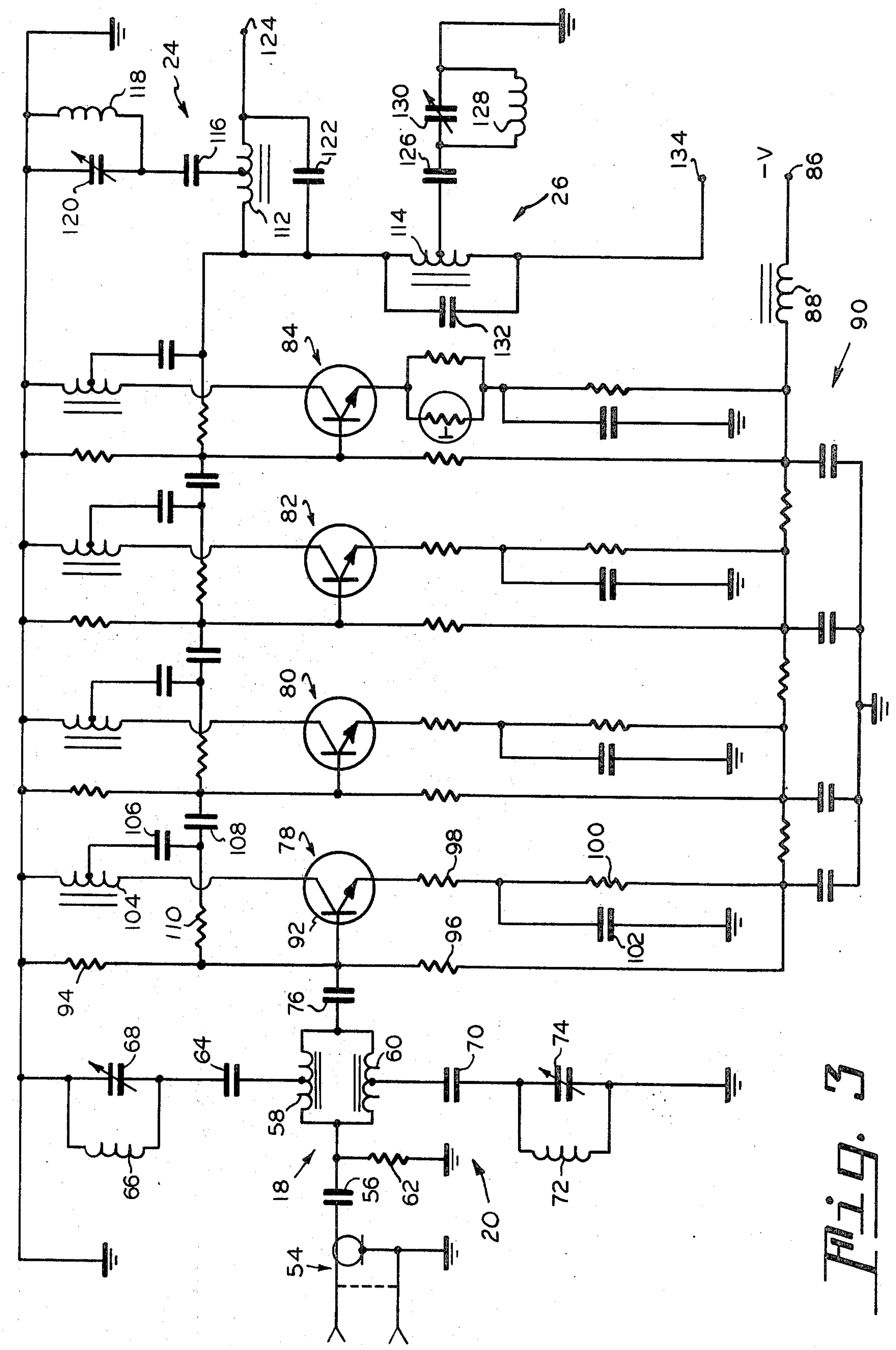
FIG. 3 is a schematic diagram of one embodiment of improved automatic gain control circuitry in accordance with the invention.

In FIG. 3 a practical embodiment of the filter and booster amplifier circuitry of FIG. 1 is illustrated. The output of directional coupler 14 is connected by a coaxial cable to a terminal 54 and to a coupling capacitor 56 which is further connected to windings 58 and 60 of filters 18 and 20, respectively. A resistor 62 is connected from the junction of capacitor 56 and windings 58 and 60 to a reference terminal or common conductor illustrated as ground.

Filter 18 further includes a capacitor 64 and an inductor 66 connected in series between a center-tap of winding 58 and ground. A trimmer capacitor 68 is connected in parallel with inductor 66 to adjust the resonant frequency of filter 18. Filter 20 is similar with a capacitor 70 and an inductor 72 connected in series between a center-tap of winding 60 and ground. A trimmer capacitor 74 is connected in parallel with inductor 72 to adjust the resonant frequency of filter 20. The output ends of windings 58 and 60 are connected together to the input of amplifier 22 represented by coupling capacitor 76.

Amplifier 22 includes four transistor stages 78, 80, 82, and 84 of which only stage 78 will be described in detail since all four stages are similar. A source of negative potential illustrated as a terminal 86 is connected via a choke 88 and a decoupling network 90 to provide biasing for amplifier 22. Choke 88 and decoupling network 90 suppress RF signals which can be present. Amplifier stage 78 includes a transistor 92 which has a base connected by a resistor 94 to ground, by a resistor 96 to decoupling network 90, and to capacitor 76. An emitter of transistor 92 is connected by a resistor 98 in series with a resistor 100 to decoupling network 90. The junction of resistors 98 and 100 is connected to ground by a bypass capacitor 102. A collector of transistor 92 is connected to ground by a winding 104 of an autotransformer which has a tap connected via a capacitor 106 in series with a capacitor 108 to amplifier stage 80. The junction of capacitor 106 and 108 is connected by a feedback resistor 110 to the base of transistor 92.

An output of amplifier stage 84 comprising the output of amplifier 22 is connected to windings 112 and 114 of filters 24 and 26 respectively. Filter 24 further includes a capacitor 116 and an inductor 118 connected in series between a center-tap of winding 112 and ground. A trimmer capacitor 120 is connected in parallel with inductor 118 to adjust the resonant frequency of filter 24. A capacitor 122 is connected in parallel with winding 112. The output end of winding 112 is connected to a terminal 124 which represents the input of detector 28. Filter 26 further includes a capacitor 126 and an inductor 128 connected in series between a center-tap of winding 114 and ground. A trimmer capacitor 130 is connected in parallel with inductor 128 to adjust the resonant frequency of filter 26. A capacitor 132 is connected in parallel with winding 114. The output end of winding 114 is connected to a terminal 134 which represents the input of detector 30.

Capacitors 122 and 132 form parallel resonant circuits with the associated ones of windings 112 and 114. These parallel resonant circuits have a very broad bandwidth with low Q to compensate for undesired signal leakage through windings 112 and 114. The phases of the signals coupled through capacitors 122 and 132 and the leakage signals coupled through windings 112 and 114 are opposite and the signals tend to cancel. This arrangement thereby compensates for impedance mismatch between the source and the load.

Filters 18 and 24, for example, are both tuned to the same pilot signal frequency. The combined rejection of the two filters provides sufficient rejection of adjacent signal frequencies to prevent undesired signals from deleteriously affecting the operation of the AGC system. Similarly, filters 20 and 26 filter the other pilot signal.

Accordingly, there has been described a novel filter and novel circuitry for filtering and amplifying pilot signals in an AGC system of the type used in broadband signal transmission systems such as CATV systems. The novel filter construction utilizes inexpensive filter components and uncomplicated construction and alignment techniques while achieving good performance. Filters in accordance with the invention provide sufficient isolation so that they can be connected in parallel. They also permit the use of a single small signal amplifier to amplify the pilot signals.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a broadband signal amplifier system having automatic gain control circuitry for automatically controllng the gain of an amplifier for amplifying a signal containing at least two frequency separated pilot signals, improved automatic gain control circuitry comprising:

a first filter having a passband including the frequency of a first one of said pilot signals;

a second filter having a passband including the freuqency of a second one of said pilot signals;

means connected to the output of said amplifier and to the input of each of said first and second filters for coupling at least a portion of the signal from said amplifier including at least said first and second ones of said pilot signals to said first and second filters;

a second amplifier connected to the outputs of said first and second filters for amplifying at least said first and second ones of said pilot signals;

a third filter connected to the output of said second amplifier and having a passband including the frequency of said first one of said pilot signals;

a fourth filter connected to the output of said second amplifier and having a passband including the frequency of said second one of said pilot signals; and means connected between the outputs of said third and fourth filters and said first-named amplifier for developing at least first and second control signals from said first and second ones of said pilot signals for controlling the gain of said first-named amplifier.

2. Improved automatic gain control circuitry as defined in claim 1 wherein said first, second, third, and fourth filters each include a tapped winding connected between an input terminal and an output terminal, and a capacitor and an inductor connected in series between the tap of said winding and a reference terminal.

3. Improved automatic gain control circuitry as defined in claim 2 wherein each of said first, second, third, and fourth filters includes a ferrite core associated with said tapped winding.

4. Improved automatic gain control circuitry as defined in claim 3 wherein each of said first, second, third, and fourth filters includes a variable capacitor connected in parallel with said inductor for tuning the center frequency of the passband of the associated filter.

5. Improved automatic gain control circuitry as defined in claim 3 wherein at least said third and fourth filters include a second capacitor connected in parallel with said tapped winding to compensate for signal leakage through said tapped winding.

* * * * *